July 3, 1945.    J. R. HEILMAN    2,379,709
TOASTING APPARATUS
Filed Nov. 30, 1943    2 Sheets-Sheet 1

WITNESSES:
INVENTOR
JOSEPH R. HEILMAN.
BY
ATTORNEY

July 3, 1945.　　　　J. R. HEILMAN　　　　2,379,709
TOASTING APPARATUS
Filed Nov. 30, 1943　　　　2 Sheets-Sheet 2

WITNESSES:　　　　INVENTOR
JOSEPH R. HEILMAN.
BY
ATTORNEY

Patented July 3, 1945

2,379,709

UNITED STATES PATENT OFFICE 2,379,709

TOASTING APPARATUS

Joseph R. Heilman, Mansfield, Ohio, assignor to Westinghouse Electric Corporation, East Pittsburgh, Pa., a corporation of Pennsylvania Application November 30, 1943, Serial No. 512,378

2 Claims. (Cl. 99—401)

My invention relates to toasting apparatus, more particularly to casing structures for such apparatus, and has for an object to provide an improved casing structure of this kind.

It is a further object of the invention to provide an improved casing for a bread toaster which will be inexpensive to construct and assemble and which may be readily removed from the toaster structure for inspection or repair thereof.

These and other objects are effected by my invention as will be apparent from the following description and claims taken in connection with the accompanying drawings, forming a part of this application, in which:

Figures 3, 6:
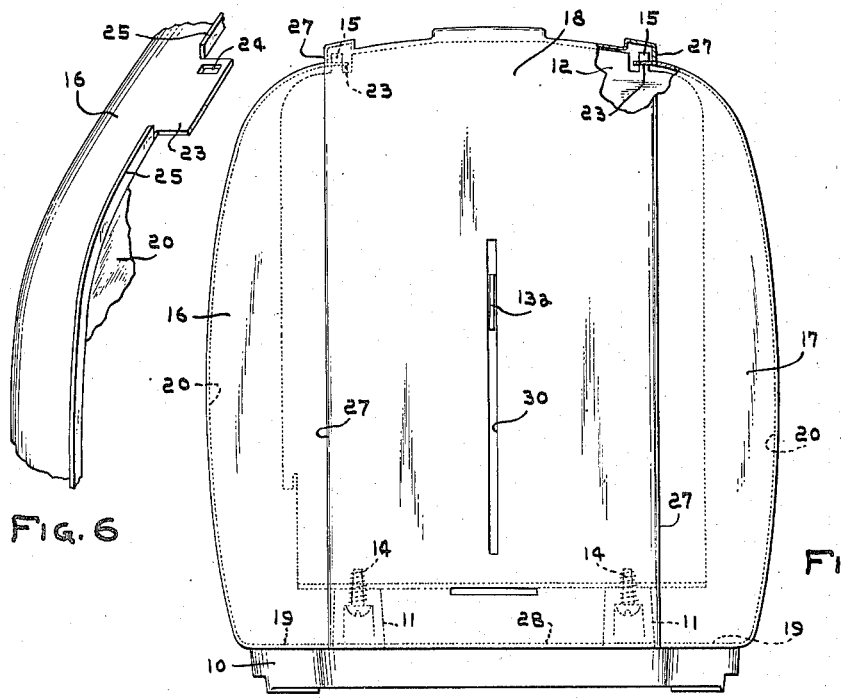
Fig. 6 is a perspective view of a portion of one of the casing side wall members forming a part of my improved toaster casing.
Figure 4:
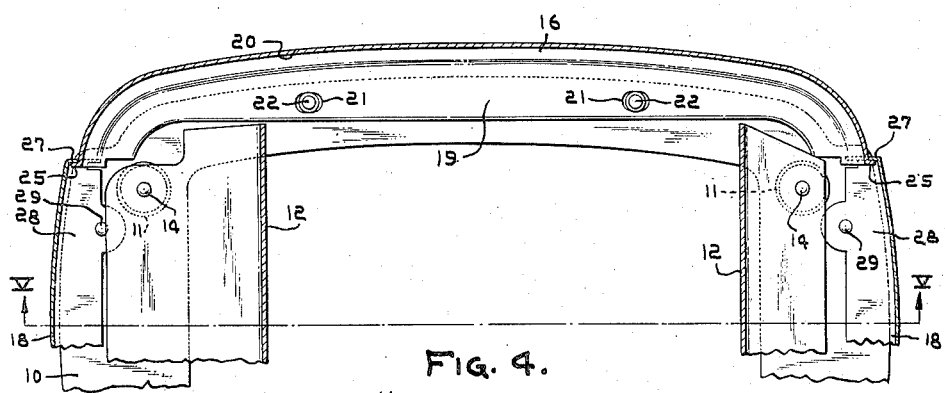
Fig. 4 is a partial sectional view taken along the line IV—IV of Fig. 2.

Referring now to the drawings, I have shown my invention applied to a well or oven type toaster which includes a base 10, preferably formed of molded material, and having upwardly-extending bosses 11. The latter support a pair of partitions 12 which are spaced apart for defining a toasting oven 13 therebetween. For the sake of brevity and clearness, I have not shown the usual heating elements and bread-supporting member which are arranged within the oven. It will be understood that the heating elements are suitably supported from the partitions 12 and that the bread-supporting member is movable upwardly and downwardly within the oven 13 by a suitable handle arranged exteriorly of the casing of the toaster in a manner well understood in the art. I have shown, however, an arm 13a which is secured to the bread carriage and which extends outwardly of the casing for the support of the handle. The partitions 12 are secured to the bosses 11 by means of suitable screws 14. The upper edges of the partitions 12 are provided with respective projections 15 which are spaced apart, as best shown in Fig. 3, for a purpose to be referred to hereinafter.

Figure 1:
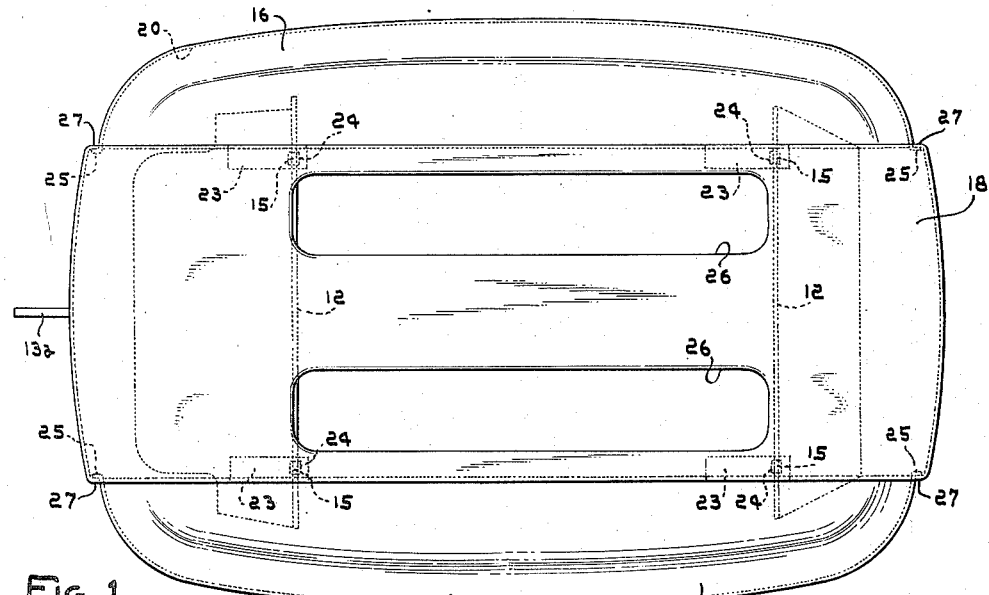
Figs. 1, 2 and 3 are, respectively, plan, side and end elevations of a toaster having a casing constructed and arranged in accordance with my invention.
Figure 2:
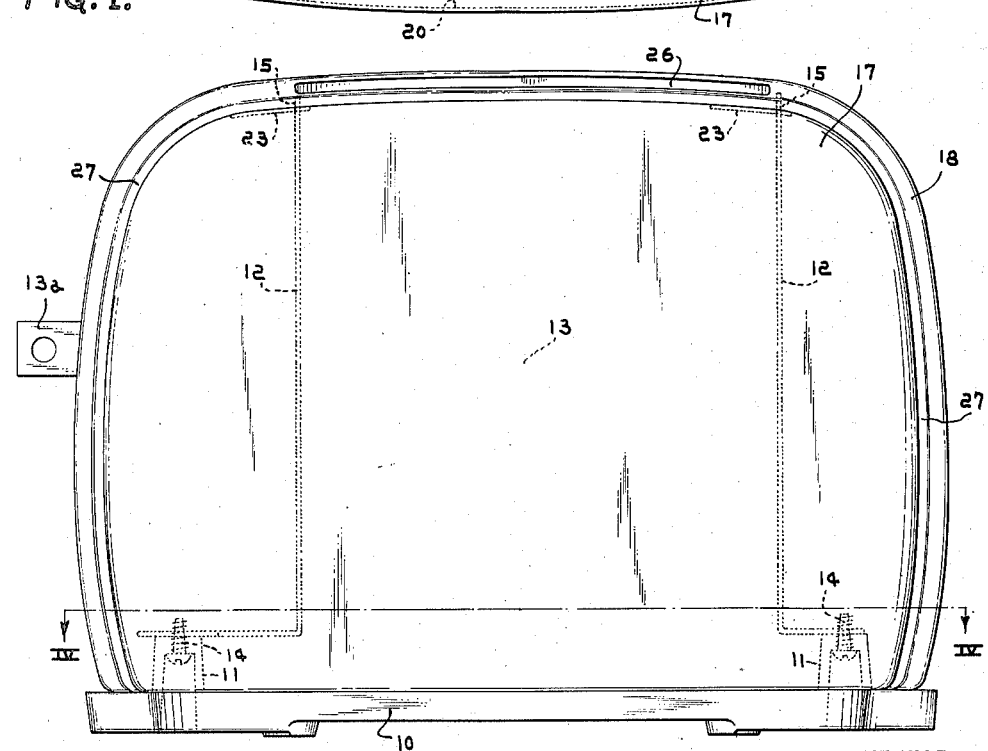

In accordance with my invention, the casing structure is formed of three major parts including a pair of side wall members, generally indicated at 16 and 17, and a centerband 18 of inverted U-shape. The side wall 16, which is preferably drawn from sheet metal, is dished outwardly, as shown at 20, and includes a bottom plate portion 19 having a plurality of spaced openings 21 formed therein. The latter are spaced to receive respective protuberances 22 which may be integral with the base 10 and which extend upwardly therefrom. The purpose of the protuberances 22 is to prevent shifting of the side walls upon the base in generally horizontal directions. The upper portion of the side wall 16 includes two inwardly-extending tabs 23 (Figs. 1 and 6) which have respective recesses 24 formed therein and which receive the projections 15 when the side wall is assembled upon the base. The projections 15 prevent movement of the upper part of the side wall 16 in horizontal directions.

From the foregoing, it will be seen that the side wall 16 when assembled to the base merely rests upon the base without being secured thereto. The ends and the top margin of the side wall member 16 are provided with an outwardly-extending flange 25 for a purpose to be referred to hereinafter. As the construction of the side wall member 17 is similar to the construction of the side wall 16, it need not be described and portions of the side wall 17 which are similar to portions of the side wall 16 are indicated by like reference characters.

Figure 5:
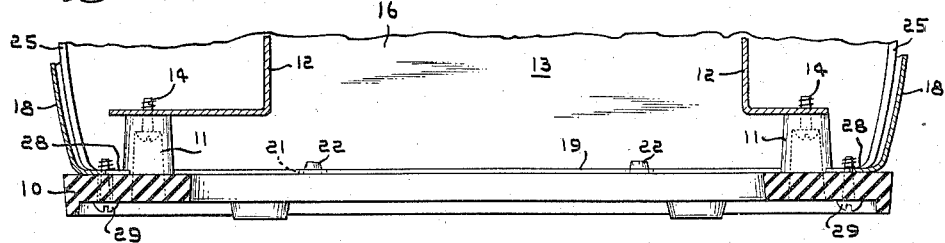
Fig. 5 is a sectional view taken along the line V—V of Fig. 4.

The centerband member 18 of the casing structure is of inverted U-shape and the top portion of the centerband includes a pair of openings 26 for the insertion and removal of bread from the oven 13. The centerband member 18 is provided on both sides thereof with inwardly-extending flanges 27. These flanges are substantially coextensive with the outwardly-extending flanges 25 and, in the assembled casing, the flanges 27 are disposed exteriorly of the flanges 25. The lower ends of the centerband 18 are provided with inwardly-extending feet 28 which are secured to the base 10 by means of screws 29 (see Fig. 5). As shown in Fig. 3, the centerband may be provided with an elongated slot 30 through which the arm 13a of the bread carriage (not shown) extends to the exterior of the casing.

In assembling the casing structure, the side wall members 16 and 17 are placed upon the base so that the openings 21 receive the protuberances 22 on the base and so that the recesses 24 receive the respective projections 15 formed on the partitions 12. The side wall members 16 and 17 merely rest upon the base and the partitions and are not secured thereto, but movement of the members 16 and 17 horizontally is prevented by the protuberances 22 and the projections 15. The centerband 18 is then lowered to bridge the space intervening between the side walls 16 and 17 and, in this position, the inwardly-extending flanges 27 are disposed on the outside of the outwardly-extending flanges 26. The screws 29 are then inserted through the base and are threaded in the feet 28 of the centerband. As the screws 29 are drawn home, the centerband is moved downwardly firmly into engagement with the base 10 and the upper portion of the centerband 18 draws the side wall members 16 and 17 into engagement with the base 10.

The assembly of the casing to the toaster structure, as described, is more readily effected than where the casing and side walls are formed as a unit which must be lowered over the projecting parts of the toaster structure. This is so because parts of the toaster structure are hidden when the one-piece casing is assembled thereto, whereas such parts are in view at all times when the separate parts of my improved casing are attached to the toaster structure. It will be apparent that the attachment of the centerband 18 to the base and side walls presents no difficulties because the only fastening devices that are employed are the screws 29 by which the centerband is drawn downwardly upon the base. The centerband being of inverted U-shape may be readily flexed outwardly to facilitate its assembly to the side walls if such flexing is necessary. In this connection, the flexibility of the centerband facilitates its passage over the extending arm 13a of the bread carriage during assembly of the band to the base.

The time and expense of assembly of a casing constructed in accordance with my invention are less than in cases where a unitary casing is employed. The usual connections between the centerband and side walls of a one-piece casing are obviated and the time required for effecting the connections is eliminated. Furthermore, a prefabricated casing of several parts constructed as a unit usually requires expensive fixtures and jigs to insure proper assembly of the parts and requires, in addition, very careful handling of the casing parts which, as is well understood, are provided with highly polished surfaces. Another disadvantage to the unitary casing is that the opening in the bottom thereof must be large enough to pass the mechanism which it encloses, and this frequently calls for a casing larger than necessary or for a casing whose shape may be objectionable from an appearance standpoint.

By providing various finishes or styling to the separate centerband and side wall members, various combinations may be readily effected at will. In the event of damage to the casing, only the damaged part need be replaced whereas, in a single unit casing, it is frequently necessary to replace the entire casing.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a toaster, the combination of a base, spaced partitions carried by the base and defining a toasting oven therebetween, and a casing structure enclosing said oven, said casing structure including side members spaced apart and resting upon the base but unsecured thereto, means associated with the base and the bottom portions of said side members for preventing the unsecured side members from shifting horizontally relative the base, said side members being dished and having a flange extending outwardly from the end and top margins thereof, a centerband of inverted U shape bridging the space between the side members and having flanges extending inwardly from the respective side margins thereof, said inwardly and outwardly-extending flanges cooperating to position the side members, means for securing the ends of the U-shaped centerband to the base and for drawing the side members into engagement with the base, and means associated with the side members and said partitions for preventing horizontal movement of the upper portions of the side members relative the partitions independently of the centerband.

2. In a toaster, the combination of a base having a plurality of protuberances extending upwardly from the base and disposed in groups on opposite sides of the base, a pair of substantially vertical partitions fixed to the base and defining a toasting oven therebetween, each of said partitions having projections formed on opposite sides thereof, and a casing structure for enclosing said oven; said casing structure having side wall members spaced apart on opposite sides of the base, said side wall members having respective bottom plates provided with openings for receiving the respective groups of protuberances on the base, said side wall members having recesses formed in upper portions thereof for receiving, respectively, the projections on said partitions, the construction and arrangement being such that shifting of the side wall members relative the base is prevented, each of said side wall members having a flange extending outwardly from the end and top sides thereof, a centerband of inverted U shape bridging the space between said side wall members and having inwardly-extending flanges disposed on opposite margins thereof, said inwardly-extending flanges engaging the side wall members, and means for securing the lower ends of the centerbands to the base and for drawing both side wall members downwardly into engagement with the base.

JOSEPH R. HEILMAN.